US011920917B2

United States Patent
Nozais et al.

(10) Patent No.: US 11,920,917 B2
(45) Date of Patent: Mar. 5, 2024

(54) METHOD FOR INSPECTING A WORKPIECE IN THE PROCESS OF BEING MANUFACTURED

(71) Applicant: I-MC, Pertuis (FR)

(72) Inventors: Dominique Nozais, Pertuis (FR); Manon Peuzin Jubert, Aix en Provence (FR); Jean-Luc Mari, Marseilles (FR); Jean-Philippe Pernot, Aix en Provence (FR); Arnaud Polette, Aix en Provence (FR)

(73) Assignee: I-MC, Pertuis (FR)

( * ) Notice: Subject to any disclaimer, the term of this patent is extended or adjusted under 35 U.S.C. 154(b) by 0 days.

(21) Appl. No.: 17/925,428

(22) PCT Filed: May 19, 2021

(86) PCT No.: PCT/EP2021/063396
§ 371 (c)(1),
(2) Date: Nov. 15, 2022

(87) PCT Pub. No.: WO2021/234062
PCT Pub. Date: Nov. 25, 2021

(65) Prior Publication Data
US 2023/0204344 A1  Jun. 29, 2023

(30) Foreign Application Priority Data
May 20, 2020  (FR) ........................................ 2005384

(51) Int. Cl.
*G01B 11/24* (2006.01)
*G01B 11/00* (2006.01)
(Continued)

(52) U.S. Cl.
CPC ............ *G01B 11/24* (2013.01); *G01B 11/005* (2013.01); *G06T 7/0004* (2013.01); *G06T 7/11* (2017.01);
(Continued)

(58) Field of Classification Search
CPC ..... G01B 11/24; G01B 11/005; G06T 7/0004; G06T 7/11; G06T 2207/10028; G06T 2207/20072; G06T 2207/30164
See application file for complete search history.

(56) References Cited

U.S. PATENT DOCUMENTS 5,345,514 A * 9/1994 Mahdavieh ............ B82Y 15/00
382/152
10,060,857 B1 * 8/2018 Bouchard ............ G01N 21/954
(Continued)

FOREIGN PATENT DOCUMENTS

EP          3913322 B1    11/2022

OTHER PUBLICATIONS

Michele Germani et al., Automation of 3D view acquisition for geometric tolerances verification, 2009 IEEE 12th International Conference on Computer Vision workshops, ICCV workshops : Kyoto, Japan, Sep. 27-Oct. 4, 2009, Sep. 27, 2009 Institute of Electrical and Electronics Engineers, Piscataway, NJ, pp. 1710-1717.
(Continued)

*Primary Examiner* — Tung S Lau
(74) *Attorney, Agent, or Firm* — H&I PARTNERS; Chai Im; C. Andrew Im

(57) ABSTRACT

The invention relates to a method for inspecting a part mounted in a manufacturing fixture between two manufacturing operations by means comprising:
a sensor
a robot to hold and move the sensor
a computer comprising memory means, computation means and display means, comprising in its memory
(Continued)

means a three-dimensional digital model of the workpiece, and able to record the coordinates of the points acquired by the sensor the method comprising the steps consisting of:

- segmenting (1010) of the CAD model into a set of surfaces, designated as nodes, each node corresponding to a surface that is visible in a single acquisition according to the characteristics of the sensor
- determining (1020) the visibility of each node from each position of the sensor relative to said node
- determining common visibilities (1030) between the nodes.

11 Claims, 11 Drawing Sheets

(51) Int. Cl.
*G06T 7/00* (2017.01)
*G06T 7/11* (2017.01)

(52) U.S. Cl.
CPC .............. *G06T 2207/10028* (2013.01); *G06T 2207/20072* (2013.01); *G06T 2207/30164* (2013.01)

(56) References Cited

U.S. PATENT DOCUMENTS

| | | | | |
|---|---|---|---|---|
| 2005/0076723 | A1* | 4/2005 | Huynh | B23Q 1/5462 73/865.8 |
| 2009/0150790 | A1* | 6/2009 | Wilhelm | A63F 13/45 715/737 |
| 2014/0277660 | A1* | 9/2014 | Nelaturi | G05B 19/40937 700/97 |
| 2015/0336227 | A1* | 11/2015 | McKay | B65D 81/113 29/559 |
| 2017/0118457 | A1* | 4/2017 | Nygaard | G01N 21/909 |
| 2022/0212306 | A1 | 7/2022 | Nozais et al. | |

OTHER PUBLICATIONS

Saha M et al., Planning multi-goal tours for robot arms, Proceedings of the IEEE International Conference on Robotics and Automation], Sep. 14, 2003; Sep. 14, 2003-Sep. 19, 2003 IEEE Service Center, Piscataway, NJ, pp. 3797-3803.

Dijkstra E W, A Note on Two Problems in Connexion with Graphs, Numerische Mathematik, Jun. 11, 1959 Springer Verlag, Berlin, DE, vol. 1, pp. 269-271.

\* cited by examiner

METHOD FOR INSPECTING A WORKPIECE IN THE PROCESS OF BEING MANUFACTURED

RELATED APPLICATIONS

This application is a § 371 application of PCT/EP2021/063396 filed May 19, 2021, which claims priority from French Patent Application No. 20 05384 filed May 20, 2020, each of which is incorporated herein by reference in its entirety.

TECHNICAL FIELD

The invention relates to the field of manufacturing, more particularly, but not exclusively, to additive manufacturing, machining by material removal or combination thereof.

The invention relates more particularly to the automated dimensional or geometric inspection of a part produced by these sorts of methods on a machine tool, between two manufacturing operations, that is to say without unloading or repositioning the inspected workpiece in the machine tool and without modifying the configuration of the machine tool.

More specifically, the invention relates to a method allowing the optimized acquisition of the surfaces of a workpiece to be inspected, for a given part, in a defined machine environment and by means of a specific sensor.

However, the invention is applicable to other situations, for example to the control of a workpiece mounted on a pallet in a palletized manufacturing cell comprising an automated control station.

PRIOR ART

The manufacture of a part includes, according to implementation examples, shaping steps organized according to a manufacturing range, implementing one or more machine tools operating by material removal, material addition or by forming, on a rough workpiece or a machining blank, in order to create geometrically defined shapes and gradually bring the shape of the workpiece closer to the final shape of the part.

By convention, a manufacturing range is divided into a succession of phases and comprises at least one phase.

Each phase is divided into a succession of operations, a phase comprising at least one operation.

Thus, on a machine tool, a phase corresponds to a succession of shaping operations, by adding or removing material, during which the positioning of the workpiece in the machine tool is not modified, and during which the configuration of the machine is not modified either.

An operation corresponds to a shaping sequence during the same phase carried out without a change of cutting tool or effector.

The implementation of a dimensional inspection between two operations or between two shaping phases on a machine tool is common practice, whether in unitary manufacturing or in automated series manufacturing.

This inspection operation aims at verifying the adequacy of the setting of the machine tool with regard to the expected characteristics of the workpiece and, depending on the result, to modify these settings, or even to reject the workpiece at an early stage of the part manufacturing.

For a matter of accuracy of the correction chain, but also for a matter of productivity, it is advantageous for the measurement operation to be carried out without unloading the part, that is to say in the same phase, and, if applicable, between two manufacturing operations.

Thus, the measurement operation is carried out in-situ, i.e. the workpiece is inspected in its manufacturing environment, directly in the machine tool or in the transfer cell without unloading the workpiece from its workpiece holder between the inspection operation and the previous manufacturing operation.

According to an exemplary embodiment, the measurement operation comprises the acquisition, carried out by a robot via an optical or other kind of sensor, of a point cloud on one or more surfaces of the workpiece to be inspected.

As the workpiece is being inspected in its machine environment, the latter being, as may be expected, cluttered, the automatic performance of the measurement operation requires posing the sensor in a position, so that said sensor is able to "see" the surfaces to be checked, thus allowing the acquisition of the point cloud to be carried out.

Moreover, in some circumstances, the environment configuration does not make it possible to ensure full visibility of the surfaces to be checked from a single point of view, and several acquisitions have to be carried out by means of the sensor, from different points of views, to ensure full coverage.

The sensor is thus connected to an effector, like a robot or a manipulator, able to move said sensor in the machine tool environment.

In the case of a manipulator arm or a robot that is external to the machine, the latter is brought into the machine environment prior the measurement operation, then retreated from it at the end of the measurement operation.

A suitable positioning of the workpiece and its surfaces to be checked, in relation to the acquisition sensor, can also be achieved by moving the workpiece, in its workpiece holder, in the space of the machine tool or of the transfer cell.

According to prior art, the automatic inspection of a workpiece is generally carried out on a three-dimensional measuring machine, that is to say in an almost ideal environment in terms of accessibility of the surfaces by the measuring sensor, the workpiece being mounted on a specific measuring support and therefore unloaded from the workpiece holder used for machining.

When implementing such a prior art method, it is known to optimize the carried-out measurement operation, i.e. to achieve a minimizing of the number of acquisitions through the use of an algorithm.

Mathematically the problem is stated as follows: given S a set of elements $\{1,2,3, \ldots, n\}$, representing all the surfaces of the workpiece that is subject to the measurement and A, a list of subsets corresponding to the surfaces that can be acquired by the measuring means and where a combination of said subsets is equal to S, we seek the smallest list of subsets in A such that the union of this list of subsets gives S.

This is an NP-complete optimization problem whose resolution difficulty, and therefore the resolution time, increases exponentially with the number of data.

Such a problem becomes even more complex to solve in the case of an in-situ measurement, where, for a given workpiece, the environment, already generally cluttered, is furthermore likely to change, either because the part is produced on several different machine tools, or because the configuration of the machine tool is liable to change, in particular between the manufacturing phases.

The document Michele Germani et al. describes an automatic measurement system for geometric tolerances that can be used during the design phase of a part. It is based on three main tools: a modular CAD-based software tool to simulate and drive the entire inspection process, an optical sensor as a part shape acquisition system, and a multiple axes robot capable of moving said sensor.

SUMMARY OF THE INVENTION

The aim of the invention is to define, for a given part and a measurement/acquisition sensor pair, the relative spatial positions of the sensor and of a workpiece allowing the acquisition of the surfaces of the workpiece that are necessary for carrying out an inspection.

The result of the method of the invention makes it possible, for this given sensor—part pair, to determine for any machine tool in which the part is produced and for any effector supporting the measurement sensor, in particular a robot, an optimized sequence of acquisitions, minimizing the number of acquisitions used to perform a measurement involving one or more surfaces of the workpiece.

To this end, the invention relates to a method for the dimensional or geometric inspection between two manufacturing operations of one or more faces of a workpiece hold in a manufacturing fixture, by means comprising:
  a measurement sensor adapted to the acquisition of points on a face of the workpiece subject to inspection, defined by an acquisition distance, an acquisition volume and an acquisition direction cone from a fixed position of the sensor;
  a robot, capable of supporting and moving the sensor;
  a computer comprising memory means, calculation means and display means, comprising in its memory means a three-dimensional digital model of the workpiece, and able to record the coordinates of the points acquired by the sensor the method comprising steps, implemented by the computer, of:
  i) obtaining a digital model of the workpiece comprising the face to be inspected and sampling this model in a point cloud by a tessellation of the faces of said CAD model
  ii) obtaining the characteristics of the sensor
  iii) creating a visibility graph, GV, of the workpiece to be inspected by:
    iii.a) segmenting the digital model of the workpiece into nodes, each node being included in the acquisition volume of the sensor and the normal of each of them being inside the acquisition cone of said sensor
    iii.b) determining the visibility of each node from each relative position of the sensor with respect to said node
    iii.c) determining common visibilities, designated as edges, between the nodes, two nodes being connected by an edge when an acquisition, carried out in a fixed relative position of the sensor with respect to the workpiece, makes it possible to simultaneously cover at least a portion of the surfaces of each of the two nodes;
  from the visibility graph obtained in step iii) defining a sequence of acquisitions making it possible to cover the face, or the faces, in a reduced number of overlapping acquisitions by defining a path connecting all the nodes of the face, or the faces, by a minimum number of edges in the visibility graph;
  implementing the acquisition sequence defined in step iv) by means of the robot moving the measurement sensor, or the workpiece on its fixture, between the positions allowing the acquisition sequence to be carried out.

Thus, the method of the invention makes it possible to reduce the NP-complete problem of determining an optimized acquisition sequence to a problem of path resolution in a graph, a problem for which robust resolutions are existing through algorithms and heuristics.

The sampling of the CAD model by tessellation makes it possible to carry out steps iii.a) to iii.c) by way of classification operations of points in files.

Advantageously, the CAD file used in step i) corresponds to the state of the workpiece in the manufacturing range at the time of the inspection operation.

Advantageously, step iii.a) comprises, for one face, the segmentation of the point cloud by a dichotomy based on the acquisition direction cone of the sensor and on the measurement volume of the sensor.

This recursive mode of implementation by dichotomy makes it possible to quickly segment the point cloud.

Advantageously, the segmentation of the point cloud comprises a step consisting in obtaining a connectivity graph of the faces of the CAD model of the workpiece, and step iii.a) comprises the steps of:
  performing the segmentation of a first face
  exploring the neighborhood of the nodes thus created in a second face neighboring the first face according to the connectivity graph
  when the point cloud of the second face is not already included in a node and when the points of a node of the first face are comprised in the acquisition volume and in the acquisition direction cone of the sensor, integrate the points of the second face in the node of the first face.

This embodiment makes it possible to reduce the number of nodes and thus to reduce the number of acquisitions required for the inspection of the workpiece as well as to shorten the calculation time.

Advantageously step iii.b) comprises the steps implemented by the computer consisting of:
  defining, on the basis of the acquisition distance of the measuring device, a voxelized space around the workpiece
  projecting, from each node, a beam of lines comprised in the acquisition direction cone of the sensor and centered on the normal to the node
  determining the voxels crossed by a line of the beam
  determining a mapping of the visibility of each face, from the voxels thus crossed by a line of the beam This embodiment makes it possible to map the workpiece visibility space as seen from the sensor, independently of the machine tool environment.

According to an embodiment, when implementing step iii.b), the voxelized space comprises a set of voxels containing the workpiece and the projection of the beam of lines is carried out from each voxel of this set comprising a node portion by using the normal to this node portion included in said voxel.

Advantageously, step iv) comprises determining a visibility sub-graph GVbis out of the visibility graph GV by implementing the steps of:
  determining the nodes covering the faces to be inspected
    b. computing, from the visibility graph GV, the shortest paths connecting one of said nodes to the other nodes of the faces to be inspected
    c. repeating step b) for each of the nodes determined in step a) successively discarding the nodes already processed d. from the result of step c) determining an optimized graph GVbis minimizing the number of edges of GV of a path passing through all the nodes determined in a).

This embodiment makes it possible to quickly determine a minimized number of acquisitions.

According to an embodiment, the manufacturing fixture is inside a machine tool comprising a work area and the robot is capable of accessing in and moving the sensor into the work area of the machine tool and step v) is carried out in the work area of the machine tool.

According to this embodiment, step v) comprises moving the workpiece in the work area of the machine tool.

According to an implementation variant, the manufacturing fixture is palletized and allows the transfer of the workpiece in its fixture between different manufacturing stations.

BRIEF DESCRIPTION OF THE DRAWINGS

The invention is described hereafter according to its preferred embodiments, in no way limiting, and with reference to FIG. 1 to FIG. 14 in which.

WAYS OF CARRYING OUT THE INVENTION

Figure 1:
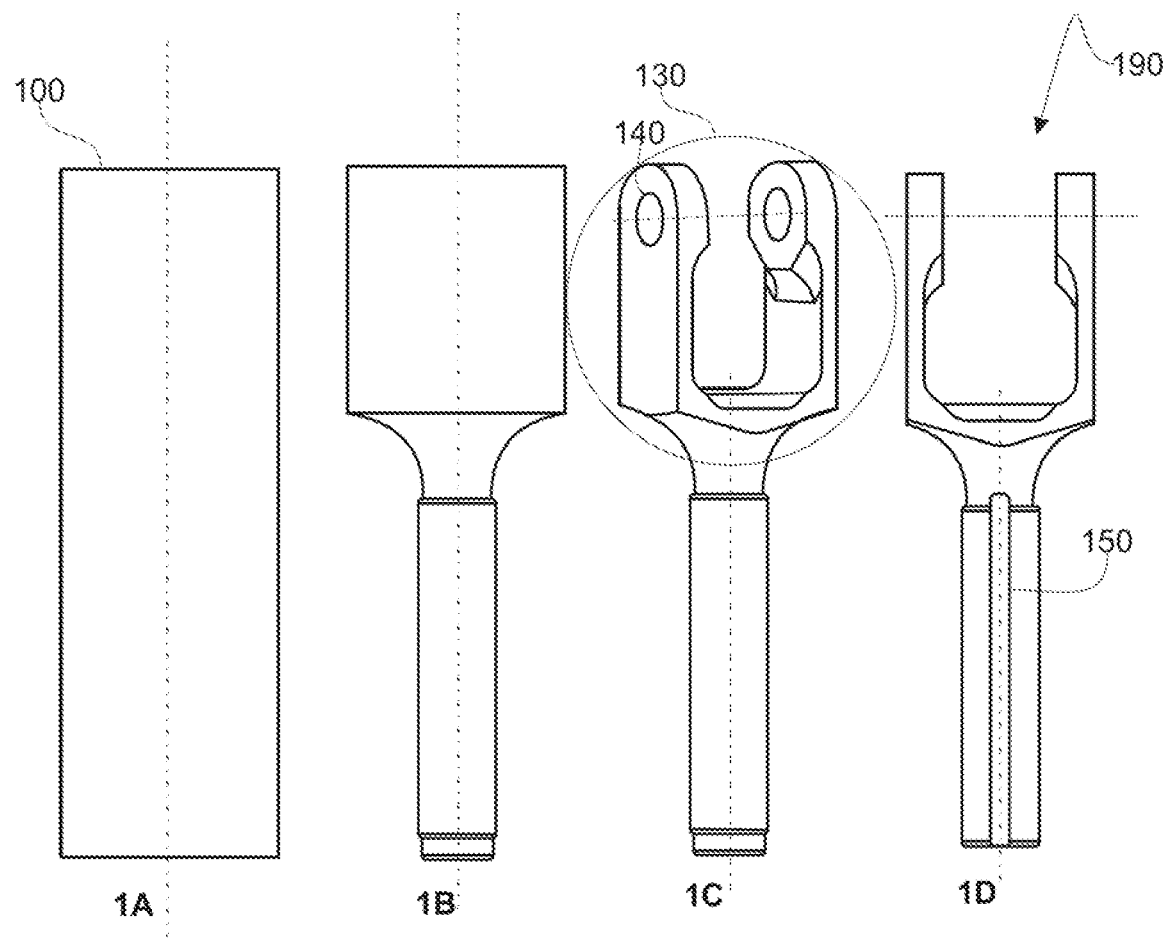
FIG. 1 is an example for illustrative purposes of a part made by material removal and implementing inspection operations according to the method of the invention.

In order to ease the description, the implementation of the method of the invention is described according to a non-limiting example implementing a part obtained by turn-milling, the inspection of which is carried out by means of an optical sensor projecting a structured light, in the environment of the turn-milling machine tool.

Those skilled in the art understand that the method applies to other configurations, in particular, when the part is produced by means of a manufacturing cell and where the part is transferred, generally automatically, on a palletized manufacturing fixture, between different manufacturing stations/machines.

In this last example, not shown, the part remains set on its pallet during the inspection, the latter being, according to variants, carried out at a specific inspection station or in the work area of one of the manufacturing stations/machines.

The operation principle of the optical sensor, according to an exemplary embodiment, consists in projecting a sequence of fringes on an object and recording the images of these fringes deformed by the relief surface of the object, using a camera generally integrated into the sensor. Processing of the sequence of images provides, for each image pixel issued by the camera, the distance from the corresponding point of the surface onto which said fringes are projected.

Thus, said sensor makes it possible to obtain, for an analyzed surface, in a point cloud, each point being defined by a vector connecting it to the optical center of the sensor, and thus to deduce therefrom the three-dimensional coordinates of each point of the cloud in a coordinate system attached to the sensor.

However, the invention is in no way limited to these types of part and sensor and is applicable to a part of any shape and to any sensor technology implementable by the method of the invention.

Throughout the text, the term "acquisition" means the acquisition by the sensor of a point cloud on a surface of a part to be inspected, carried out in a fixed relative position of the part and the sensor, and the recording of said point cloud.

In a turn-milling center and according to an exemplary embodiment, the workpiece is held in a rotating chuck, which chuck is used for setting and holding in position the workpiece in the machine tool, as well as for driving the workpiece in a spinning cutting motion around a z axis.

The z axis may be horizontal or vertical.

According to a common and nonlimiting exemplary embodiment, a turret attached to a carriage supports a plurality of cutting tools that may be changed by a rotation of the turret, the carriage being able to move parallel to the z spinning axis of the workpiece, as well as along an x axis perpendicular to it, according to motions numerically controlled at programed speeds and positions, to carry out turning operations, meaning to generate, by material removal, shapes that exhibit a rotational symmetry with respect to z axis.

Some machines tools have several turrets and several carriages, which are also capable of moving along a y axis perpendicular to z and x axes.

This type of machine tool generally comprises an axial carriage, capable of moving along the z axis and performing, for instance, drilling and reaming operations along the z axis at the center of the workpiece, the cutting motion being provided by driving of the workpiece.

The machine tool further comprises a carriage supporting a motorized spindle able to hold a milling, drilling or reaming tool, the cutting motion of which being provided by said motorized spindle.

The carriage supporting this spindle can move along x, y and z axes of the machine tool, or even along a rotational axis or around x axis, according to numerical control motions at programed speeds and positions, to perform milling operations.

The chuck is also numerically controlled. During a turning operation, the chuck drives the workpiece in a spinning cutting speed corresponding to said operation, during a milling operation, the chuck is moved to a programed fixed position or drives the workpiece into a feed motion corresponding to the carried out milling operation.

Within the framework of an in-situ measurement operation, the turrets, the carriages and the chuck are part of a machine-tool environment and the elements of this machine tool environment are likely to mask the view or the accessibility of the measurement sensor and are also liable to collide with said sensor or the effector supporting it.

FIG. 1, according to a nonlimiting embodiment of a workpiece illustrating the implementation of the method of the invention, the final part (190, FIG. 1D) is produced by material removal starting from a cylindrical machining blank (100, FIG. 1A), for instance, a bar.

Figure 10:
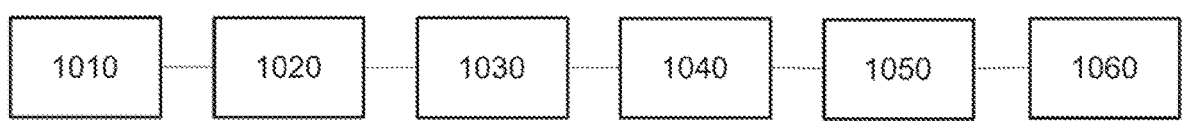
FIG. 10 shows the overall flowchart of the method of the invention.

According to an exemplary embodiment, the part is produced in a single phase, meaning without modifying the positioning of the workpiece in the machine tool, alternatively, it is produced in two phases, for example with a turn-up of the workpiece between the states corresponding to FIG. 1B and FIG. 10.

The machining operations include cylindrical turning operations for the transition from the state of FIG. 1A to the state of FIG. 1B then milling operations along several planes and drilling-reaming operations for the making of the fork (130) and of the bore (140) of said fork, FIG. 10, as well as a milling grooving, for making the groove (150) FIG. 1D.

Finally, a lathe bucking operation makes it possible to separate the part (190) from the bar.

The method of the invention is implemented in order to define the position of the measurement sensor pose, relative to the workpiece in the machine tool environment, with the aim of inspecting the workpiece while in intermediate states between the machining operations.

Thus, by way of a nonlimiting example, a first inspection operation consists in checking, in the configuration of FIG. 1B, the position and the diameter of the cylindrical rough part of the fork, a second inspection operation consists in checking the fork (130) and the bore (140) during or after the corresponding milling operations.

By way of example, the checks to be carried out during this second inspection operation relate to dimensional checks such as the diameter of the bore (140) or the opening of the fork (130). Such checks can be carried out by known probing techniques of the prior art without unloading the workpiece, however, these techniques of the prior art use the indications issued by the encoders of the axes of the machine tool and are therefore dependent on the geometry of the machine tool and on the validity of the information issued by said encoders.

According to other examples, the geometric inspection carried out may also be about: the parallelism of the outer faces (231, 232) as well as of the inner faces (241, 242) of the fork, the perpendicularity of the axis (245) of the bore with respect to the faces (231, 232, 241, 242) of the fork as well as with respect to the axis of the cylindrical portion (200) of the workpiece, the symmetry of the branches of the fork with respect to the cylindrical portion (200) or the coplanarity of the axis (245) of the bore and the axis of the cylindrical portion (200).

The person skilled in the art understands that if the workpiece was to be unloaded from the machine tool and placed in a three-dimensional measuring machine to carry out these inspections, it will be impossible to reposition the workpiece in the machine tool with such an accuracy suitable to carry out the following operations, would it only be because the workpiece has to be separated from the bar.

The other advantage of an in-situ inspection is to allow the correction of subsequent manufacturing operations so as to either cure an out-of-tolerance dimension or to prevent a subsequent operation from being out-of-tolerance because of the outcome of a previous operation.

Thus, according to an exemplary embodiment, the inspection operation is an integral part of the manufacturing process and makes it possible to improve precision and reduce rejection rates, or at the very least, to reject an improper workpiece as early as possible.

Figure 3:
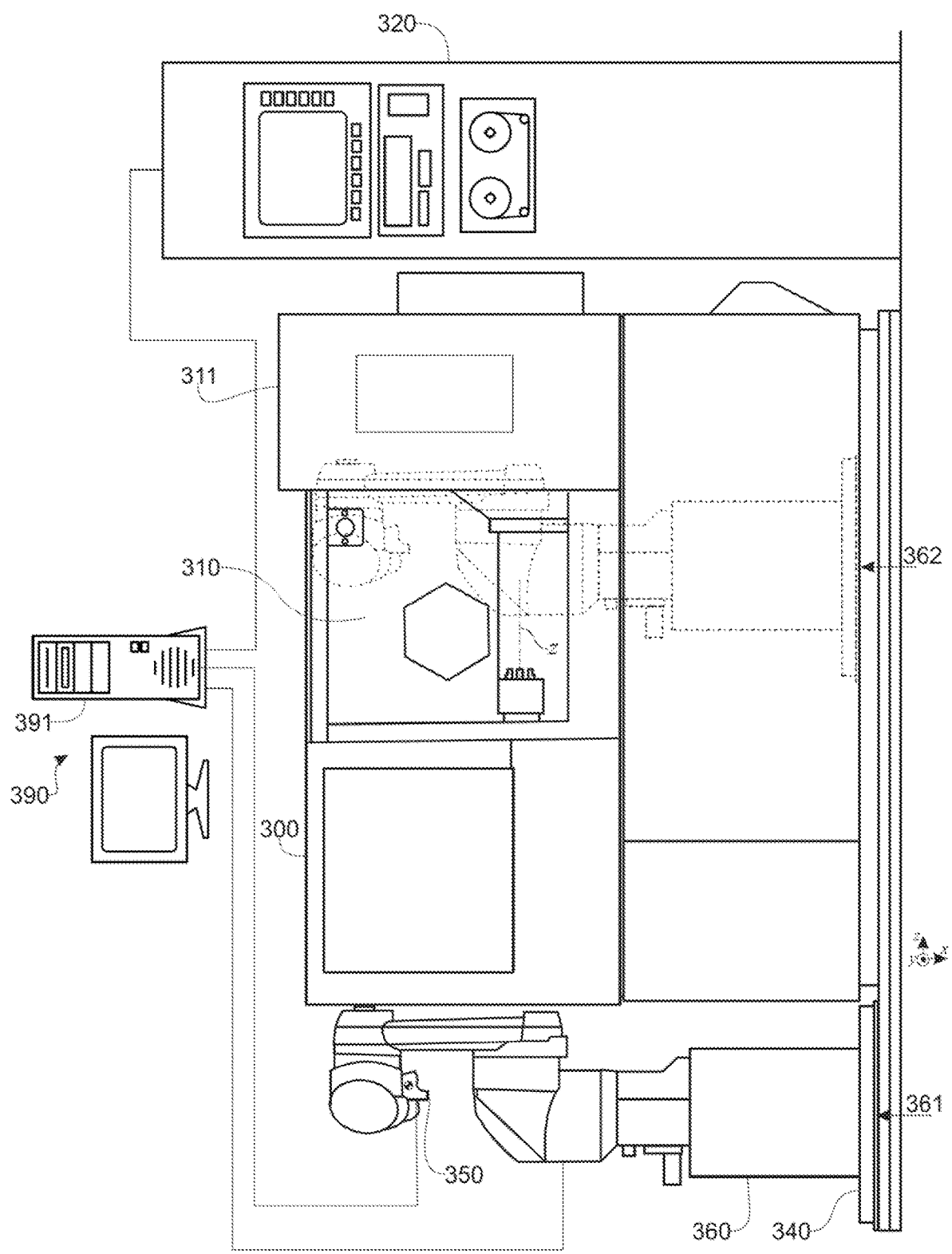
FIG. 3 is an overview of a system showing the implementation context of an exemplary embodiment of the method of the invention.

FIG. 3, to this end, the method of the invention relates to the implementation of a system comprising a numerical controlled machine tool (300), here a turn-milling center. Said machine tool comprises a secured work area (310), corresponding to the machine tool environment and to the area in which the workpiece is transformed.

Accessing to this secure area is protected by a door (311) and security means so that, when said door is open, the machine is in a safe configuration and, as for instance, only authorizes axes motions at reduced speed without allowing cutting motions.

For performing machining operations, the machine tool is controlled by a programable numerical controller (320).

The system includes an effector carrying a measurement device (350).

According to an exemplary embodiment, the effector is a poly-articulated, anthropomorphic robot (360), which robot is mounted on a support carriage (340) making it possible to move the robot (360) relative to the machine tool (300) in particular in order to bring it closer or to move it away from the secure work area (310) of the machine tool.

Thus, when the robot (360) is in a retreat position (361), it is possible to access the machine tool without hindrance, in particular for loading a machining blank or for unloading a finished part, or even to set up cutting tools in the turret.

To perform an inspection operation, the robot (360) is moved into an inspection position (362) allowing it to access the work area The robot (360) holds a noncontact measuring device (350), for example an optical sensor projecting a structured light, and makes it possible to move it.

The system comprises a supervision station (390) comprising a computer with memory and computation means, as well as input and display means.

The supervision station is connected and exchanges information with the numerical controller (320) of the machine tool, with the robot (360) and its mobile carriage (340) in particular to move the robot along its axes and relative to the machine tool, as well as with the measurement device (350) in particular in order to retrieve the coordinates of the points in the point cloud acquired by this device.

The method of the invention aims at the preparation of the inspection operations implemented by means of the system described above or of any other system that is equivalent in terms of functionalities.

More specifically, the method of the invention aims to provide, for a given part-sensor pair, the relative positions of said sensor with respect to said part, making it possible to carry out the acquisition of all the surfaces to be inspected in a minimum of relative poses.

The result of the method of the invention is not specific to a given machine tool environment, it is generic and adaptable to an environment of any machine tool and any effector implementing the given sensor-part pair.

When implementing the method of the invention, the sensor, whatever its type, is characterized by a maximum and a minimum acquisition distance with respect to the surface subject of the acquisition, these are distances which can be interpreted as focusing distances.

The terms "focusing distance" refer more particularly to an optical sensor, but the person skilled in the art understands that even a mechanical sensor (i.e. a probe) includes a minimum distance and a maximum distance of measurement with respect to a surface, depending on the sensor technology. Therefore, these terms should be interpreted in this sense.

Figure 4:
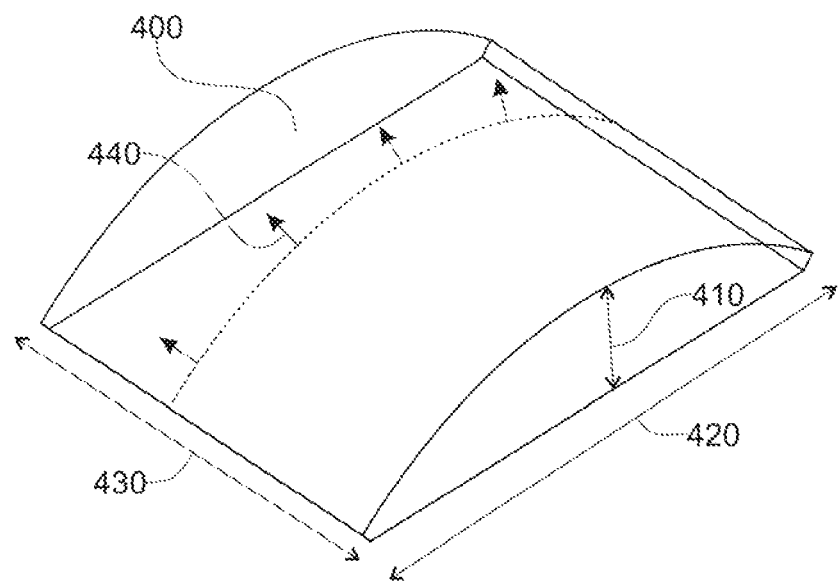
FIG. 4 shows, in a perspective view, an example of a measurement volume of a sensor implemented within the framework of the method of the invention.

FIG. 4, when the sensor is placed at a distance from a surface that is within its focusing range, the sensor is able to acquire the position of any point of this surface located in a measurement volume (400), which measurement volume is defined by the measurement range (410) of the sensor, which can be interpreted as a depth of field. Depending on the type of sensor, this range is of variable thickness over the measurement volume: a scanned area defined by its width (420) and its length (430) and a maximum relative angle of acquisition with respect to the normal (440) to said surface.

The shape of the measurement volume (400), shown in FIG. 4, is purely illustrative and depends on the technology and on the capabilities of the implemented sensor.

When all the points of the surface whose acquisition is foreseen are inside this measurement volume (400), the acquisition of the point cloud corresponding to this surface is potentially achievable by a single acquisition, without moving the sensor or the workpiece bearing said surface.

According to a purely illustrative and nonlimiting example, a given optical sensor has, for instance, a focusing range comprised between 200 mm and 320 mm, an acquisition surface of 200 mm in width (420) and 150 mm in length (430), a measurement range (410) of 120 mm and a possible measurement angle in a cone with a half-angle of 45° with respect to the direction of the axis of the sensor.

Thus, according to a first condition, in order for any pair of points, a and b, of the workpiece to be acquired during the same acquisition by the sensor, these two points must lie both in the measurement volume (400) of the sensor.

According to a second condition, neither of the two points should be optically masked by another surface of the workpiece.

Figure 2:
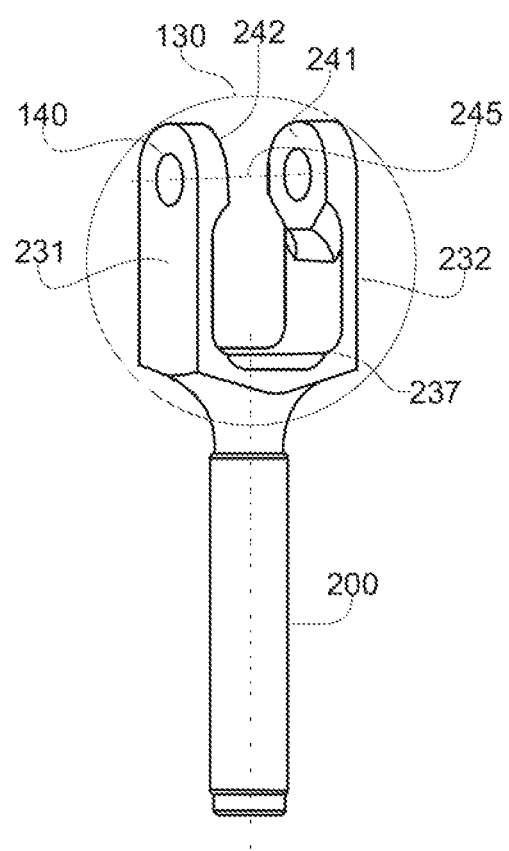
FIG. 2 shows the part of FIG. 1 in a configuration of progress of the manufacturing range during which an inspection operation is performed.

For instance, returning to FIG. 2, it is not possible to carry out, during the same acquisition, the acquisition of the two outer surfaces (231, 232) of the fork, as those are mutually masking each other.

According to a third condition, neither of the two points must be optically masked by an obstacle in the environment at the time of the measurement. This condition is specific to the machine tool environment.

If one of these conditions is not fulfilled, the two points cannot be acquired during the same acquisition by means of the sensor and then there are two possibilities left for carrying out a measurement involving these two points.

According to a first possibility, there is another relative position of the sensor pose with respect to the workpiece in which the three conditions are met with respect to a and b.

If this first possibility cannot be implemented, then a measurement involving these two points a and b shall be performed by implementing at least two separate acquisitions.

These two acquisitions are then carried out according to different relative positions of the sensor pose with respect to the workpiece.

A different relative positioning of the sensor pose with respect to the workpiece means a translation of the optical center of the sensor with respect to the workpiece or a different orientation of the sensor with respect to its optical center, the "or" being of the inclusive type.

In the latter case, for the measurement to be possible, there must exist at least a third intermediate point c, such that the 3 conditions stated above are fulfilled with respect to a and c and to b and c.

Pursuant to this principle, it is easy to understand that it is possible to carry out a measurement between two points or two distant groups of points on the basis of several distinct acquisitions, since there is always at least one intermediate point, such as point c, between two acquisitions, so that the several acquisitions can be readjusted with respect to each other.

The relative positioning of the sensor pose with respect to the workpiece during each acquisition is obtained by moving the sensor by means of an effector (360, FIG. 3), or by moving the workpiece.

In a specific environment, the proportion of the surface of the object to be inspected which is visible from the sensor, taking into account the characteristics of the latter, is also a function of the relative position of the sensor pose with respect to the workpiece.

This relative position is a function of the respective positions of the workpiece and of the sensor pose in this space and of their respective orientations.

In a specific environment, it is also necessary to check that these relative acquisition positions are attainable, that is to say that there is no obstacle prohibiting one of the relative positions, that the pose is in the space reachable by the effector and that there is a collision free trajectory between two acquisitions relative positions.

These constraints as well as the third condition mentioned above are specific to a given machine tool environment, to the specific effector holding the sensor and to the sensor.

The person skilled in the art understands that faced with a given surface/sensor measurement situation, there is an infinity of possibilities for carrying out the measurement.

If the number of measurements is too low or badly organized, there is a risk that the measurements will not overlap correctly to achieve their relative readjustment and therefore lead to an unreliable inspection. If the number of acquisitions is too high, the measurement time increases rapidly without bringing any gain in terms of precision.

Thus, the method of the invention aims at automatically defining a mapping of the space according to the visibility that it offers, of a given part with respect to a sensor, for measuring given characteristics, and to determine the relative positions of the part and the sensor pose allowing the acquisition of all the surfaces of the part in a minimum of acquisitions.

The mapping and the acquisition pose positions obtained, are specific to the part and to the sensor and are independent of the machine tool environment.

They can then be used in any machine tool environment, by introducing the specificities of this environment into this mapped space.

Returning to the example of points a and b above, it is easy to understand that the measurement uncertainty, for example of a measurement of the distance between a and b, will be lowered as this measurement is carried out on the basis of a minimum number of acquisitions.

It is also obvious that the inspection of a part will be quicker as the number of acquisitions to carry out this inspection is reduced.

Thus, the method of the invention makes it possible to both improve the productivity of the in situ inspection operation and to improve its precision.

The method of the invention thus comprises a plurality of steps aimed at determining a mapping, in order to implement the targeted inspection operation. These steps are implemented by the computer and include, as an input, the CAD model of the workpiece to be checked and the characteristics of the sensor, namely, its minimum and maximum focusing distances, its measurement volume and its measurement limit angles.

Since the objective is to carry out an in-situ inspection of a part during its manufacturing, the CAD model considered is the one corresponding to the state of the workpiece at the manufacturing stage at which it is during the foreseen measurement operation. According to exemplary embodiments, the CAD model is obtained from a CAD/CAM (Computer Aided Design and Manufacturing) software or is built specifically to reflect the state of the workpiece at the manufacturing stage corresponding to the inspection carried out.

The CAD model includes a plurality of faces.

A face is a geometric entity subject to an inspection.

Thus, returning to FIG. 2, the inspection pertains for instance to a single face, for example the cylindricity of the cylindrical shank (200) of the part, or to several faces, for example the parallelism of the outer faces (231, 232) of the fork.

According to these two examples, neither of these two inspections can be carried out by a single acquisition. Thus, the acquisition of the shape of the cylindrical shank (200) cannot be carried out in a single acquisition because the acquisition limit angles of the sensor extend, at best, over 180°.

The same issue arises for the inspection of the two outer faces (231, 232) of the fork, even with the assumption that each of these faces, taken individually, can be acquired in a single acquisition.

In the two preceding examples, it will be necessary to run a plurality of acquisitions, the surfaces covered by each of these acquisitions having, at least two by two, an overlap suitable to allow their relative readjustment.

In the example of the two outer planar faces (231, 232) of the fork, the two faces have no surface nor even a portion of surface in common. Therefore, in order to perform a measurement involving these two faces, it will be necessary to acquire at least a portion of at least one other face (237), extending between said two faces so as to be able to readjust the measurements relative to each other.

FIG. 10, to this end, the method of the invention essentially comprises 3 mapping steps comprising:
- a segmentation (1010) of the CAD model into a set of surfaces, designated as nodes, each node corresponding to a surface that is visible in a single acquisition according to the characteristics of the sensor
- determining (1020) the visibility of each node from each position of the sensor pose relative to said node
- determining the common visibilities (1030), designated as edges, between the nodes, two nodes being connected by an edge when an acquisition makes it possible to simultaneously cover at least part of the surface of each of the two nodes.

Figure 9:
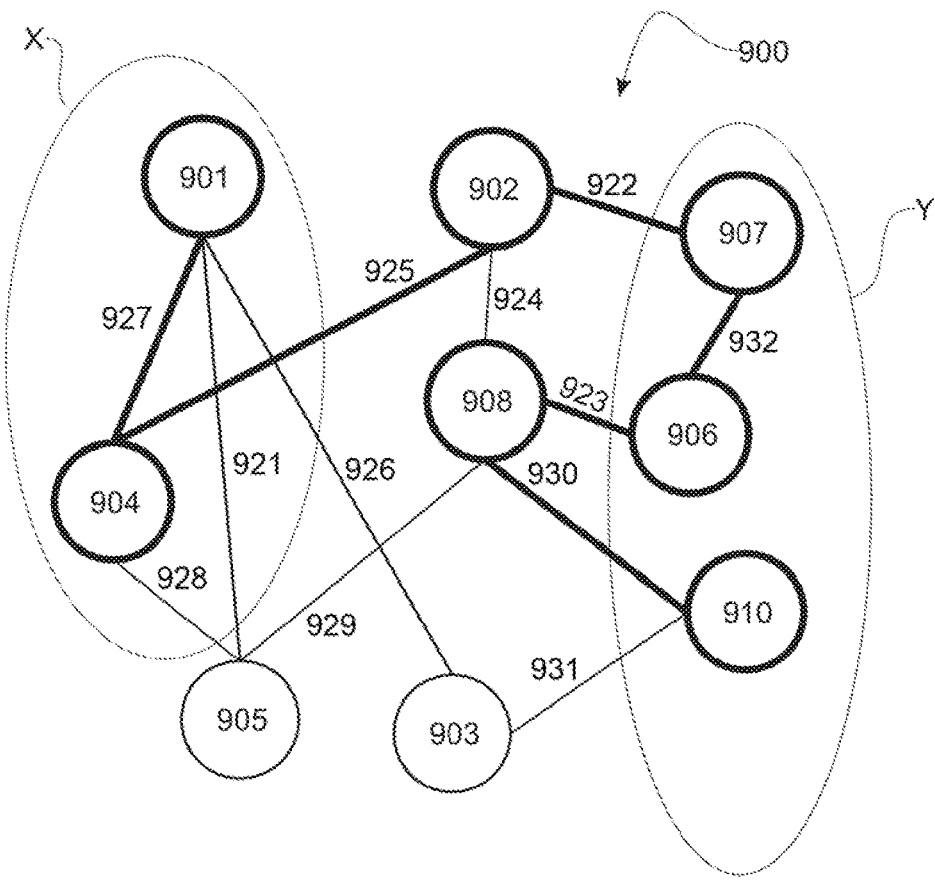
FIG. 9 shows an example of a visibility graph.

FIG. 9, carrying out these three mapping steps makes it possible to obtain a visibility graph (900).

Said visibility graph makes it possible, during an optimization step (1040), to determine for a face, a set of faces or more generally the whole part, an acquisition sequence making it possible to cover all the faces of the part being inspected in a minimum of acquisitions comprising adapted overlaps.

The optimization consists in determining, from the visibility graph, the shortest path taking the edges of the graph and passing only once through each of the nodes associated with the faces subject to the inspection.

This problem is an NP-complete problem which is solved by implementing a heuristic and an algorithm.

Coming back to FIG. 10, during an implementation step (1050), the positions corresponding to the acquisition sequence are translated into relative positions of the part and of the sensor pose and into relative trajectories for positioning the effector carrying the sensor and of the machine tool axes.

Finally, during an inspection step (1060) the motion and acquisition program thus determined is implemented by the robot and the machine tool through their controllers, following the instructions received from the supervision station in order to carry out the acquisition operations required for the performance of the inspection.

CAD Model Segmentation

According to an exemplary embodiment, the segmentation of the CAD model comprises a first step consisting in sampling the model in the form of a point cloud.

As a matter of fact, the surfaces of the CAD model are generally defined mathematically in the form of geometric entities (cylinders, planes, spheres, etc.) or even in the form of NURBS (Nonuniform Rational B-Spline). The operations described below consist essentially in classifying portions of these surfaces into sets and establishing the relationships between these sets.

According to an advantageous exemplary embodiment, these operations are thus performed on sets of points resulting from this sampling.

The model being split into faces, i.e. surface entities separated by edges, an inspection operation pertains to one or more faces.

Thus, a first operation consists in a tessellation of the CAD model of the part, i.e. the surfaces are meshed by contiguous elementary plane polygon blocks, for example triangular meshes, of adapted dimension with reference to a deviation tolerance relative to the actual surface. This operation is known from the prior art and is not explained any further.

At the end of the tessellation operation, in the case of triangular meshes, each mesh comprises 3 points, each of these points is shared among 3 meshes and each mesh comprises a normal to its surface.

Thus, each point is associated with an average normal direction corresponding to a vector combination of the 3 normals corresponding to the 3 common meshes.

The tessellation operation thus delivers a set of meshes which is translated into a list of points, each of the points being associated with spatial coordinates and a normal direction in a coordinate system attached to the part.

According to an advantageous embodiment, the meshed surface is sampled at a reduced number of points according to a predefined surface density of points.

Whatever the embodiment, each point of the cloud corresponding to the model is associated with a face.

The point clouds corresponding to each face of the model are split into subsets, each subset comprising points of the face whose acquisition is possible during a single acquisition. Such a subset constitutes a node.

Figure 5:
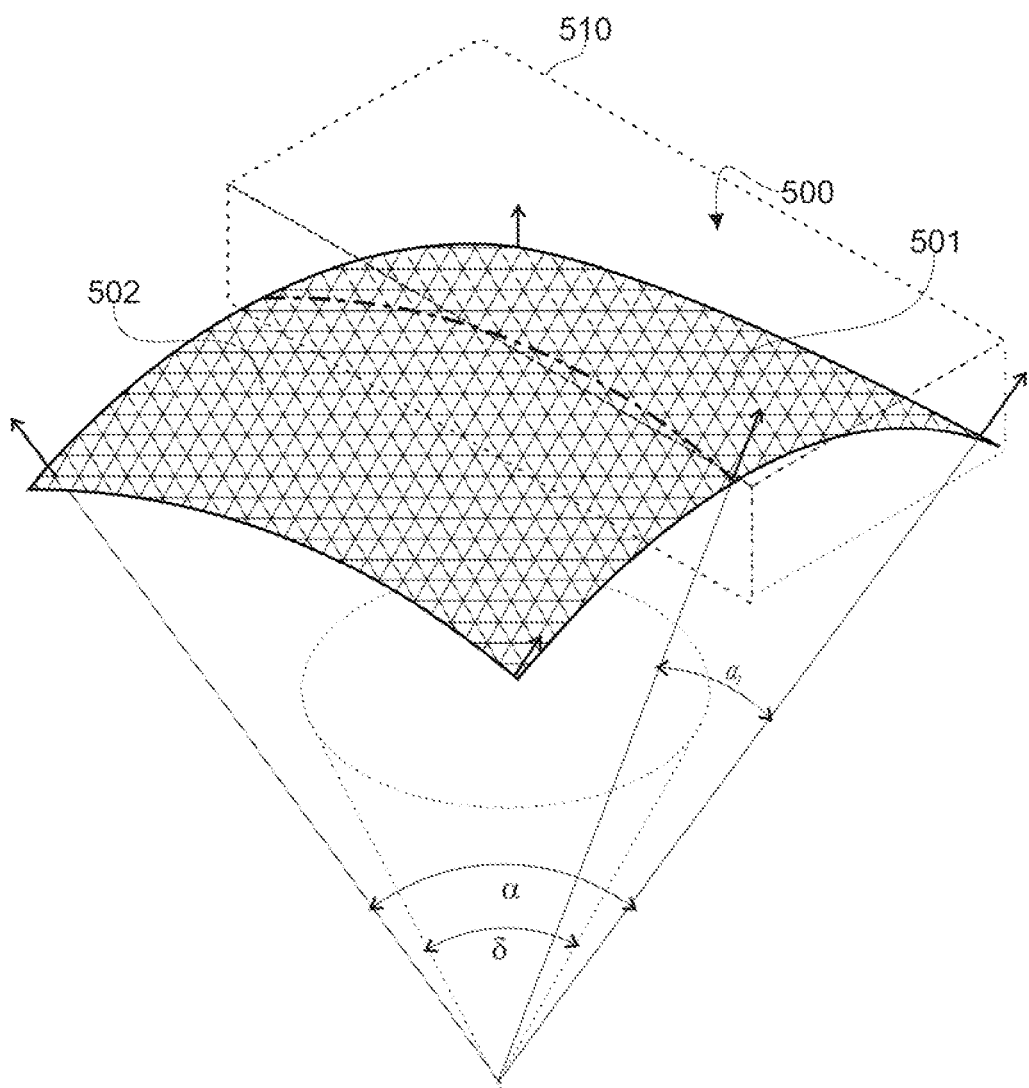
FIG. 5 illustrates, in a perspective view, the faces segmentation principle.

FIG. 5, starting from any surface (500), for the whole sampled points of this surface to be acquired in a single acquisition, the maximum deviation angle α of normals between the points of this surface must be comprised in the angle δ of the cone of measurement of the sensor.

If this is not the case, as in this figure, the surface, actually the point cloud, is split into 2, thus providing 2 points clouds (501, 502). These two points clouds are contiguous but not overlapping.

According to this example, the maximum normal deviation condition is fulfilled on each of the 2 points clouds (501, 502), for example, the deviation a1 in the cloud 501 being less than δ, then the set of points of this cloud (501) can be acquired in a single acquisition, provided they are comprised in the measurement volume (510) of the sensor If the spatial footprint of the point cloud (501) fits within the measurement volume (510) of the sensor, as this is the case in this figure, then the set of points in the cloud (501) constitutes a node that can be acquired by the sensor in a single acquisition.

If the spatial volume of the point cloud (501) is greater than the measurement volume (510) of the sensor, then said cloud (501) is split into 2 and each of the subsets of points resulting from this split is examined with respect to the measurement volume (510) of the sensor.

According to an exemplary embodiment, the splits of the point cloud (500) are carried out by implementing a Kmeans type clustering algorithm. This algorithm groups the points of the cloud into two clusters (501, 502), that is K=2, on the basis of the minimization of a distance with respect to a centroid. The considered distances are, for example, for the angular deviation condition, the angular deviation of each point with respect to the centroids and for the volume condition, the Euclidean distance with respect to the centroids.

The Kmeans type clustering algorithm is known from the prior art and is not explained any further.

These operations are repeated on all the faces of the model until they are all segmented into a plurality of nodes that are contiguous but without overlapping. Each node is thus a set of points whose spatial distribution and orientations of the normals allow their acquisition in a single acquisition by the measurement sensor.

Figure 7:
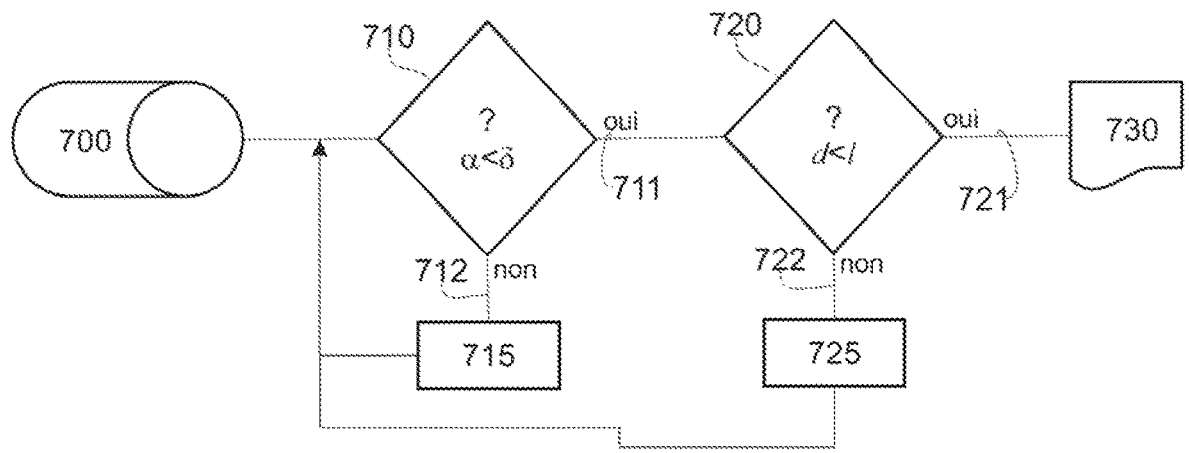
FIG. 7 is an exemplary flowchart of the face segmentation method.

FIG. 7, to this end, each face is analyzed according to the recursive scheme illustrated above.

Starting from the point cloud (700) associated with the considered face and determined during the previous sampling operation, according to a first test (710) the angular distance a between the normals of the points of the cloud is checked. If this distance is greater (712) than a given angular tolerance (δ), corresponding to the angular measurement limit of the sensor, the point cloud is split into 2, during a split operation (715) based on the angular distance, resulting in 2 subsets.

The process is repeated on each of the subsets thus obtained, until the face is thus split into several subsets, each of which falls within the angular measurement tolerance of the sensor.

For example, if the sensor's angular measurement range is +/−45°, then the cylindrical face (200, FIG. 2) is split into 4 subsets. On the other hand, on a flat face (232, FIG. 2), the subset, at this stage, consists of the entire face.

When all the points of the considered subset are within the angular tolerance (711), the corresponding subset is analyzed according to a test (720) based on the measurement volume of the sensor.

According to an exemplary embodiment, the point cloud is represented by a bounding box and the test (720) relies on the distance between the vertices of the box.

The distance d between the vertices of the box encompassing the point cloud is compared with an admissible distance l, between the vertices of the box (610, FIG. 6) corresponding to the measurement volume of the sensor.

If (722) d is greater than l, it means that the subset fills a volume greater than the sensor volume. Accordingly, it is split during a splitting operation (725) based to the measurement volume.

The process is repeated on the 2 resulting subsets and again, until all the points of each subset are contained in a volume compatible with the measurement volume of the sensor. Given the points of said subset are also distant from each other by an angular distance compatible with the characteristics of the sensor, the acquisition of said subset can be achieved in a single acquisition.

Thus, when this condition on the measurement volume is fulfilled (721) for a subset, said subset constitutes a node.

The process is repeated until any and all points in the point cloud corresponding to the face are assigned to a node.

The implementation of this principle using dichotomy is fast and makes it possible to define nodes distinct from each other.

At this stage, each point of the cloud resulting from the sampling belongs to a node, each node belongs to a face, and a file (730) is obtained associating each point with a node and with a face.

Thus, according to this method, each node covers at most one face and one face is covered by at least one node.

The spatial volume filled by each node is at most equal to the measurement volume of the sensor but may be smaller than this volume.

The angular deviation between the normals of the points included in the node is at most equal to the angular measurement capacity of the sensor.

Expansion of the Nodes

The recursive scheme described above is applicable face by face to the whole point cloud corresponding to the model. In such a case, at the end of the segmentation operation, each point belongs to a node, each node belongs to a face and the points included in a node fit in the acquisition volume and the measurement cone of the sensor.

Figure 12:
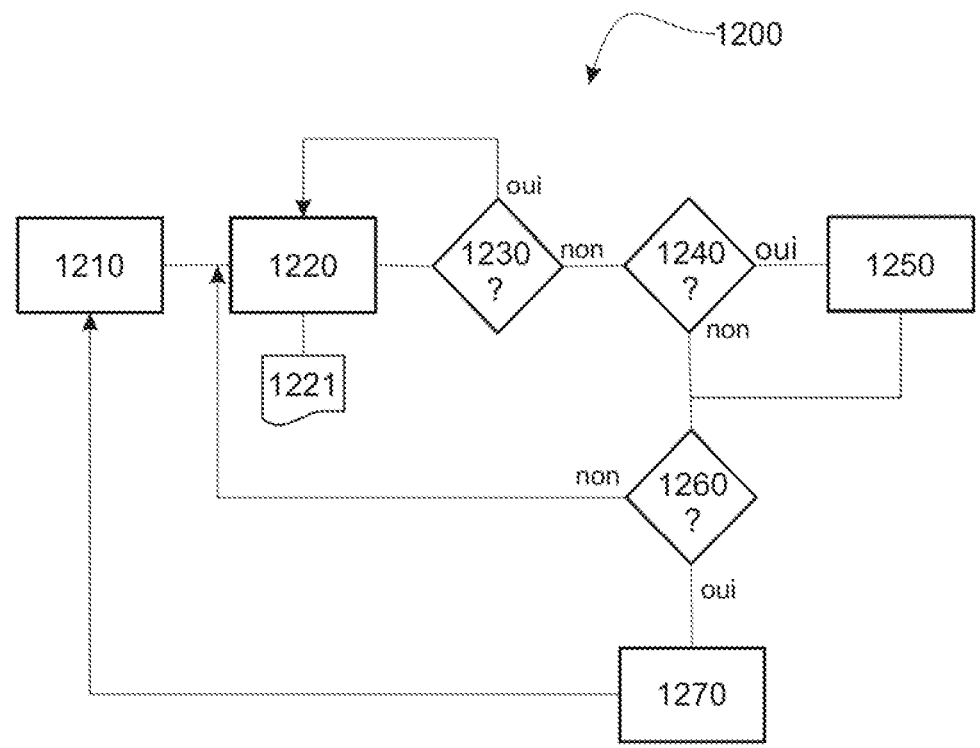
FIG. 12 is an exemplary flowchart of a model segmentation including an exploration of adjacent faces.

However, FIG. 12, according to an advantageous embodiment making it possible to reduce the number of nodes, the building of the nodes comprises a step (1220) of expanding the nodes to the neighboring faces.

Thus, starting from a first face, said face is segmented (1210) into nodes according to the principle explained in the steps of FIG. 7.

During an exploration step (1220) the points belonging to faces adjacent to this first face are explored.

The faces adjacent to the first face are defined by a connectivity graph (1221).

Figure 11:
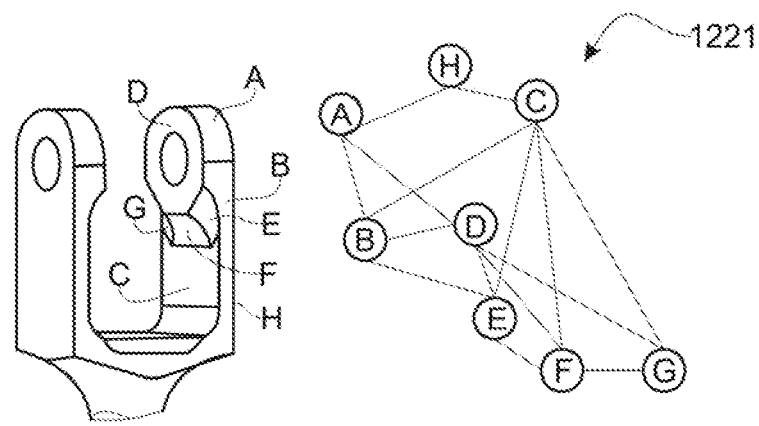
FIG. 11 shows a partial example of a connectivity graph between the surfaces of a CAD model.

FIG. 11 gives a partial example of such connectivity graph between the faces (A, B, C, D, E, F, G, H) of a model.

Two faces are connected and adjacent when they share a common edge.

Thus, according to this partial example, face C is connected to faces E, F, G and B.

Figure 13:
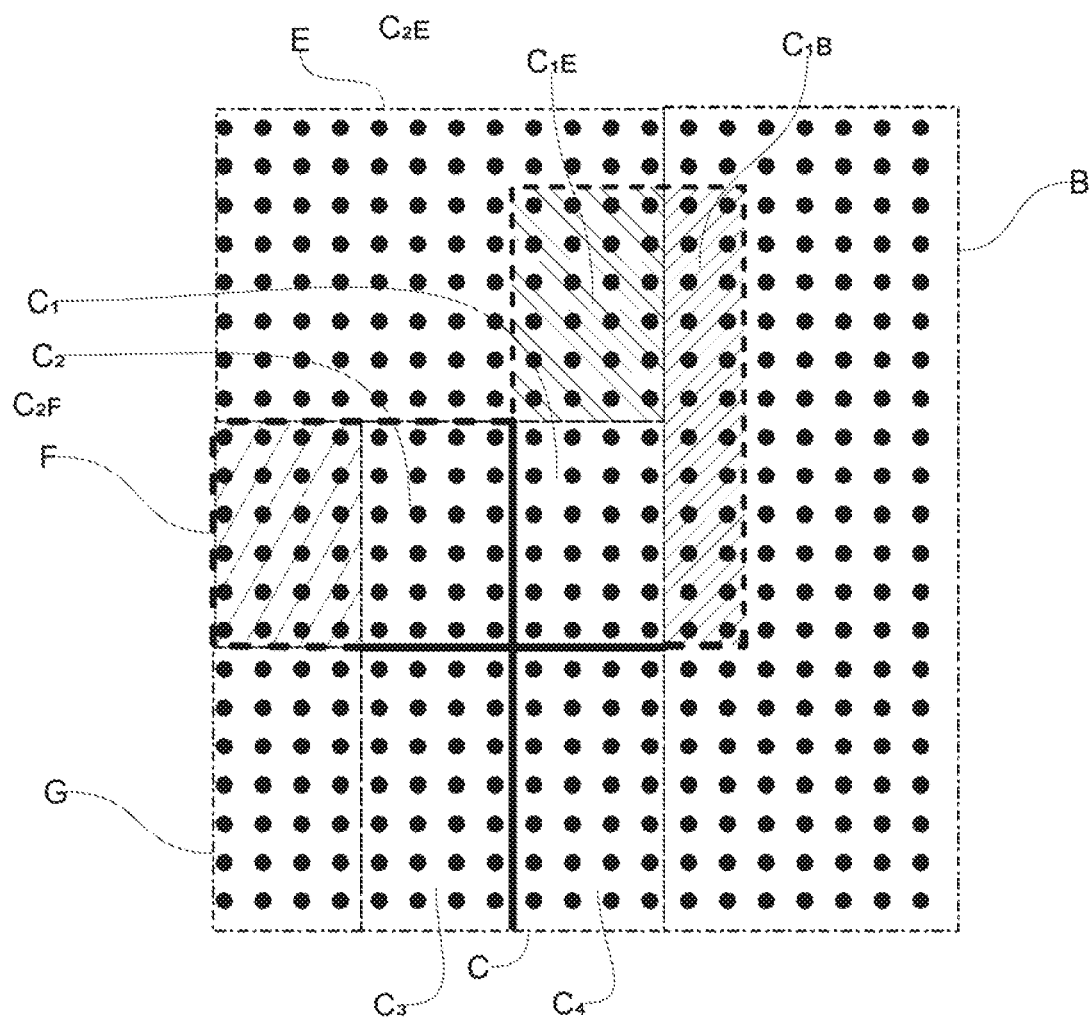
FIG. 13 represents, according to a flat block diagram, the step of expansion of the nodes towards the adjacent faces, during the segmentation of the model.

FIG. 13, according to the principle, in an example where the first face to be segmented is face C, following this segmentation step, the adjacent faces, E, F, G and B are explored.

FIG. 13 is an illustrative block diagram of the method applied to a node of a face in a planar representation to ease the reading.

According to an example, face C is initially covered by 4 nodes (C1, C2, C3, C4).

During the exploration of neighboring faces, according to this simplified example, node C1 can potentially be extended towards face E and face B, node C2 towards face E and face F, node C3 towards face G and node C4 towards face B.

According to this example, only part of the points of face B (C1B) and of face E (C1E) are likely to fit in the measurement volume of the sensor at the same time as the points of node C1.

It is the same for the points of face E vis-à-vis node C2, only part of the points (C2E) of this face are likely to fit in the measurement volume of the sensor at the same time as the points of C2 node.

On the other hand, according to this example, all of the points on face F (C2F) are likely to fit in the measurement volume of the sensor and the acquisition of these C2F points can be carried out in a single acquisition at the same time as the points corresponding to node C2.

Thus, node C2 is extended to face F and thus relates to the set of points C2∪C2F, so that face F, integrated into node C2 is not subject to a subsequent segmentation.

On the other hand, according to this exemplary embodiment, faces E and B which can only be partially covered during an acquisition of a node of face C are subject of a specific segmentation.

Thus, at the end of the segmentation operation according to this embodiment, each point of the point cloud corresponding to the model belongs to a single node, each node extends over one or more faces and each point of the same node fits into the acquisition volume and into the acquisition cone of the sensor.

Coming back to FIG. 12, a first face being segmented during a segmentation step (1210), during an exploration step (1220) the points belonging to the adjacent faces are explored.

If (1230) the point cloud belonging to a neighboring face thus explored already belongs to a node, the face is not taken into account and the exploration continues on another adjacent face. If the face is not already assigned to a node, then, if (1240) the surface covered by the node with the addition of the point cloud corresponding to this face falls within the acquisition volume and in the measurement cone of the sensor, then the point cloud corresponding to the face is added to the node in a step of expansion of the node (1250).

If (1260) all the faces neighboring the node have been processed, then a new face among those which have been added to the node considered (1270) and the process is resumed with this new face.

The process is repeated until no more point clouds corresponding to an entire face can be added to the current node.

This overall process (1200) is repeated in as many iterations as necessary, until all the points of the cloud corresponding to the part model have been assigned to nodes.

Thus, at the end of the segmentation step, whatever the embodiment, with or without exploration of the adjacent faces, each point of the cloud corresponding to the model is attributed to a unique node, defining a set V of the nodes of the model.

Determining Nodes Visibility

Figure 6:
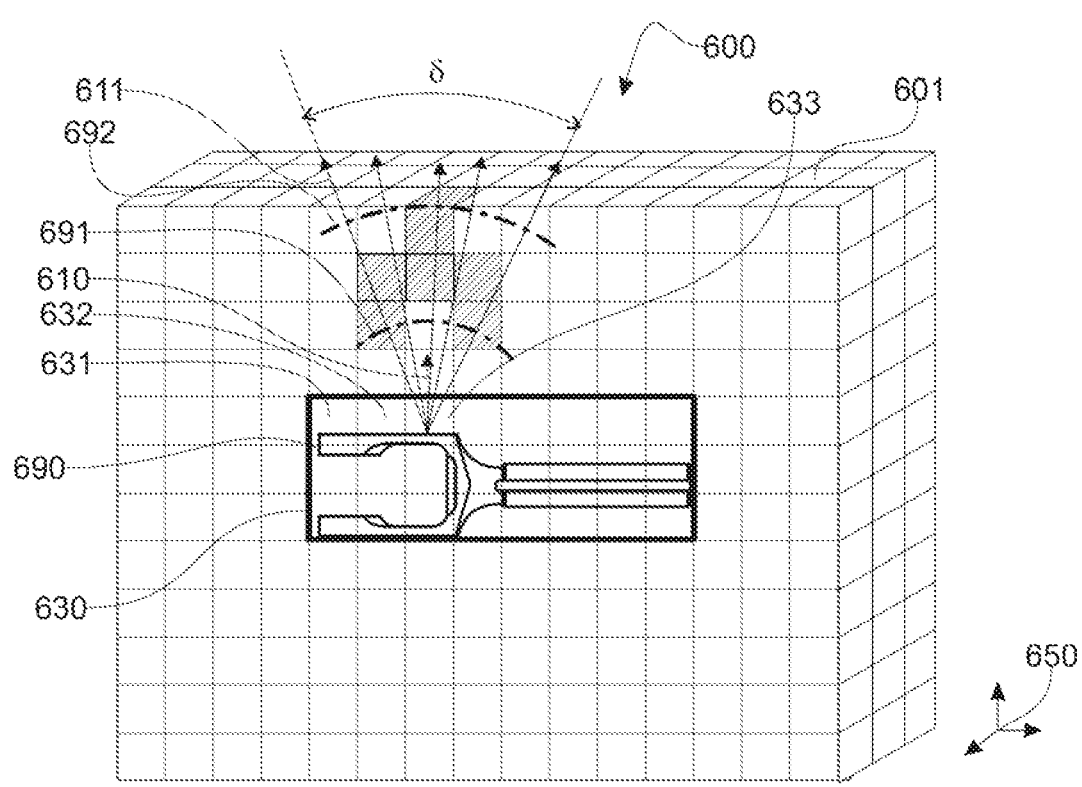
FIG. 6 illustrates, in a perspective view, the principle used for determining visibility maps.

FIG. 6 according to an exemplary embodiment, the sampled model (690), i.e. the point cloud corresponding to the part, or to the faces subject to the inspection, is placed at the center of a voxelized space (600).

A voxelized space is a space discretized into a plurality of voxels (601), a.k.a. elementary volumetric elements. Each voxel (601) is defined by its elementary volume, in this case the edge length of the cube corresponding to this element, and the position of its center in a coordinate system (650) attached to the voxelized space.

The voxelized space includes a bounding box (630) comprising the part model (690). The remaining space (600) extends around this bounding box according to distances that are functions of the measurement distances, a.k.a. focusing distances, of the sensor.

For example, in each direction of the coordinate system (650), the outer boundaries of the voxelized space are at a maximum sensor focus distance from the boundary of the bounding box (630) of the model (690).

When the sensor includes a minimum focusing distance, only the voxels located at a distance greater than this minimum distance are considered.

Generally, the voxelized space (600) takes any shape based on the minimum and maximum sensor focus distances from the part bounding box.

In the bounding box (630), some voxels (631, 632, 633) are crossed by a node, i.e. points belonging to this node are included in said voxels given their spatial location.

Thus, according to this example, each of these voxels (631, 632, 633) comprises a certain portion (number of points) of the node.

From each voxel (631, 632, 633) a plurality of lines (611) are drawn in directions corresponding to the angular tolerance cone of the sensor and centered on the average normal (610) of the points of the node included in the voxel.

Each time one of these lines (611) intersects a voxel in a space outside the bounding box (630), and wherein said voxel is between the minimum (691) and the maximum (692) focusing distances of the sensor, the portion of the node located in the voxel (631, 632, 633) from which the line (611) originates is visible from each voxel (hatched in the figure) crossed by said line.

The operation is repeated for each voxel comprised in the model.

At the end of this process, a visibility map (930) of the whole space is obtained, meaning that for each voxel of the space (600), the occupied voxels, therefore the nodes, which are visible from this voxel.

Figure 8:
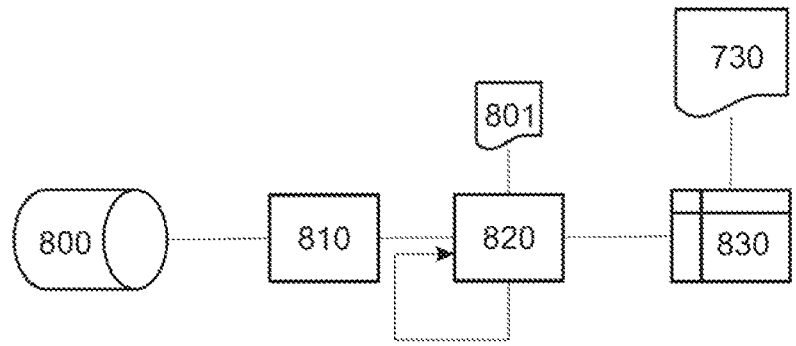
FIG. 8 is an exemplary flowchart of the determination of the visibility map.

Thus, FIG. 8, according to an exemplary embodiment, starting from the grid of voxels (800), according to a first step (810) of classification, the voxels of the grid are sorted into voxels comprising a node and, where appropriate, the percentage of the node included in this voxel. Thus, a connection is made between the set of nodes and the set of voxels of the grid.

During a projection step (820), for each occupied voxel, a beam of lines is calculated according to a cone whose apex angle is equal to the visibility angle ($\delta$) of the sensor, defined in a file (801) of the characteristics of the sensor, and having as axis, the normal to the surface of the node occupying said voxel.

The process is repeated for each node of the set V of the model nodes.

Thus, an ordered list (830) is built assigning to each point of the cloud, coordinates, membership of a face, membership of a node, and a list of voxels of the voxelized space (800) from which the point is visible with the coordinates of these voxels.

This result (830) makes it possible to determine, for example, from which voxel or relative position of the sensor pose with respect to the part, a point, a node or a face are visible, or conversely from a given voxel, which are the points, the nodes or portions of nodes, face or portions of face that are visible from this relative position of the sensor pose with respect to the part.

Building of the Visibility Graph.

The visibility graph establishes, within the list corresponding to the result of the previous step, the relationships between the nodes according to their visibility from the voxelized space.

FIG. 9, the visibility graph (900) includes nodes (901, . . . , 910) and edges (921, . . . , 930). Each node corresponds to a set of points resulting from the point cloud segmentation operation, and this set of points covers a surface whose acquisition is potentially feasible by means of the selected measurement sensor in a single acquisition.

An edge (921, . . . , 932) exists between two nodes if a voxel exists in the voxelized space from which a given proportion of each of these nodes is visible in a single acquisition with the sensor pose in the relative position with respect to the part corresponding to said voxel.

By way of example, this proportion is taken equal to 80% without this example being limiting.

Thus, between two nodes (901, 904) separated by an edge (927) there is a relative position of the sensor pose from which at least 80% of each node (901, 904) is visible.

Thus, for each set of points, said to be the starting points, having a node and a visibility voxel in common, and comprising at least 80% of the elements of the node, we search among the other sets of points having the same visibility voxel for those which include at least 80% of the elements of another node, and if such a set is found, an edge is drawn between the starting node and this other node, this until all the voxels of the voxelized space, the visibility of which covers at least 80% of the elements of a node, have been considered.

At the end of this operation, two nodes are connected together by an edge when there is at least one voxel of the voxelized space, from which at least 80% of the surface of each of the nodes is visible.

Consequently, this classification operation provides a list of edges with, for each edge, the nodes between which it spreads, and the voxels of the voxelized space from which this visibility is obtained.

Several edges may initiate or arrive at a node.

Optimization

To carry out an inspection involving one face or a plurality of faces of the part, it is necessary to cover all the nodes corresponding to these faces, and if necessary, nodes belonging to other faces which allow the overlapping and the readjustment of the acquisitions relative to each other.

The faces to be inspected are defined by the user, for example by pointing to said faces via a graphic interface representing an image of the workpiece at its actual state within the progress of the manufacturing range.

From the file obtained at the end of the segmentation step, the nodes corresponding to each face are known and define the set V comprising all the nodes of the model.

Similarly, the visibility graph GV determined previously gives the relationships between all the nodes of the model in terms of common visibility.

The inspection, given the face or faces on which it takes place, concerns a S set of nodes comprised in set V.

The optimization of the acquisition sequence consists in extracting from the visibility graph GV a subgraph GVbis covering all the nodes of S and in which the sum of the edges to be traversed, known as the path, to cover these nodes is minimized.

Determination of GVbis

By way of an illustrative example, FIG. 9, the inspection pertains to two faces, face X includes the nodes 901 and 904, and face Y the nodes 906, 910 and 907. The example here pertains to an inspection involving two faces, the person skilled in the art understands that the same principles apply to an inspection involving only one face or more than two faces.

According to a first step, starting from one of the nodes belonging to a face to be checked, the shortest paths between this node and each of the nodes to be checked are sought.

Thus, starting from node 904 the shortest way to go to node 901 is edge 927. The shortest way to go to node 907 passes through edges 925 and 922, etc.

FIG. 9, on the graph this search is trivial but in practice the visibility graph is more complex and has many more nodes, so the search for the shortest path is carried out by an appropriate algorithm, for example by means of the of Dijsktra Algorithm.

This algorithm is known from prior art and is not explained any further. A description of this algorithm is given in: EW DIJKSTRA, "*A note on two problems in connection with graphs*", Numerische Mathematik 1, pp. 269-271 (1959)

For the implementation of this algorithm, the length of each edge is the same and taken equal to 1.

The node (904) being processed, the length of the paths from this node to the others is updated and it is no longer considered in the rest of the analysis.

The same analysis is then carried out from the node closest to this first node, e.g. node 901 according to this example.

Thus, the shortest path from node 901 to node 907 travels along edges 921, 929, 924 and 922 or 921, 929, 923 and 932, insofar that node 904 is no longer taken into account in the analysis.

In this case, these paths (4 edges) are longer than the addition of the paths between node 904 and node 901 (1 edge) and the path between node 904 and node 907 (2 edges), the latter solution is therefore retained between node 901 and node 907. Otherwise, the first solution would have been retained.

The analysis is continued according to the same principle from node 901 towards nodes 906 and 910. The paths are updated, node 901 is no longer considered and the analysis is continued from the node closest to the node 901, i.e. node 910, and so on until all the nodes of all the faces to be inspected have been processed.

From there, it is easy to recreate the shortest path by taking the shortest paths from each of the nodes, graph GVbis is obtained, shown in bold lines in FIG. 9.

Implementation

From a practical point of view, each edge of GVbis corresponds to an acquisition made from at least one point in space, that is to say a voxel in the voxelized space, according to a given orientation of the measurement sensor.

Each edge thus represents at least one relative position of the measurement sensor pose with respect to the workpiece, and this position can be reached by the combination of a position/orientation of the sensor in the machine tool space associated with a position/orientation of the workpiece in this same space.

Thus, the number of edges of the graph GVbis corresponds to an optimization of the number of acquisitions to be carried out to cover the surface, or the surfaces, that are subject to inspection, while ensuring an overlap between the acquisitions. This result depends only on the part and on the characteristics of the sensor, and is independent of the machine tool.

FIG. 10, during the implementation step (1050) these relative positions are translated into positions of the axes of the robot and of the axes of the machine tool, by introducing the kinematics of the robot and of the machine tool, the environment of the machine tool and the positioning of the workpiece in this environment.

This step pertains to assisted programing of the robot and the machine tool according to methods known from the prior art, which, in addition to the relative positionings, make it possible to generate collision free trajectories both of the robot and of the axes of the machine tool between the different relative positions.

The measurement operation is carried out through successive acquisitions corresponding to this program.

It should be specified that these acquisitions result in the acquisition of a measurement volume corresponding to that of the measurement sensor, which measurement volume is greater than or equal to the volume of the nodes considered for the determination of the optimized acquisition positions.

The determination of the nodes and the segmentation of the model are necessary for the determination of the optimal acquisition positions but are no longer used for the rest of the inspection operation.

If one of the relative positions of the sensor pose with respect to the part is not reachable, for example, because an element of the environment, not movable, prevents the sensor from reaching this position, the previous optimization operations result makes it possible to quickly find a solution Thus, according to a first example of a solution, as specified above, an edge corresponds to at least one relative position of the sensor pose with respect to the workpiece, which means that several relative positions of the sensor pose can correspond to an edge with respect to the workpiece.

These positions are defined in the file (830, FIG. 8). Thus, if one of the relative positions corresponding to an edge is not reachable in the real environment in which the inspection is carried out, a first step consists in exploring the other relative positions, listed in said file (830), corresponding to this same edge.

If this first step does not provide a solution, a new acquisition sequence is determined from the GVbis graph.

Figure 14:
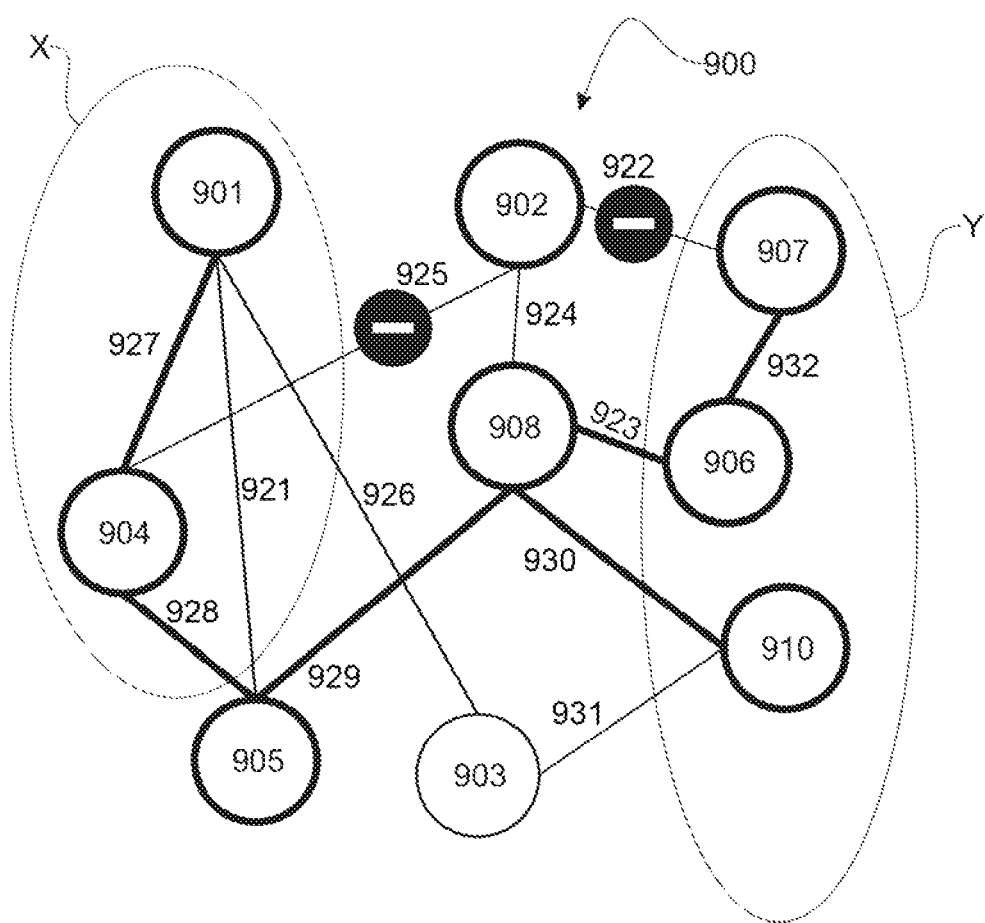
FIG. 14 illustrates an example of computation of a new visibility graph when relative control positions are not accessible.

Thus, in the example of FIG. 14, it is considered that none of the relative positions corresponding to the edges 925 and 922 of the graph GVbis is reachable, which amounts to prohibiting the path from passing through these edges.

By applying the same method as described hereinabove, it is possible to determine by the same algorithm a new path, i.e. a new suitable graph GVbis by deleting from the visibility graph GV (900) the edges 922 and 925, bold lines in FIG. 14 give an example of a GVbis graph optimized in this new context.

The description above and the examples of implementation show that the invention achieves the intended aim and makes it possible to define an optimized sequence of acquisitions for the automatic in-situ inspection of a face or a set of faces of a workpiece in its production environment, this problem being, at its core, an NP-complete problem.

The method of the invention achieves this result by segmenting a CAD model of the part according to a recursive method derived from the characteristics of the measurement sensor, then by projecting the nodes thus obtained into a virtual space, still according to the characteristics of the sensor, and thus reducing the problem to the resolution of a graph, a problem for which robust resolution heuristics exist.

The person skilled in the art understands that if Dijkstra's method is an effective means for solving this problem, there is a bunch of other methods for determining an optimal path in a graph, which, if necessary, can be used depending on the complexity of the graph and of the problem.

The method of solving the initial complete NP problem is inseparable from the inspection operation to which it dictates implementation possibility, the precision and the performance in terms of performance time.

According to the presented embodiments the method uses a CAD model of the part as an input, which model is then sampled in a point cloud. The person skilled in the art understands that the implementation of the method of the invention can be carried out from a point cloud corresponding to the part, obtained by a measurement carried out on a mock up or on a physical sample of the part.

The invention claimed is:

1. A method for an inspection of a face of a workpiece that is held in a manufacturing fixture, between a first manufacturing operation and a second manufacturing operation of a manufacturing range, by means comprising:
    a measurement sensor adapted for acquiring points on the face of the workpiece, the measurement sensor having an acquisition distance, an acquisition volume and an acquisition direction cone from a fixed position;
    a robot configured for holding and moving the measurement sensor in positions;
    a computer comprising a memory, computation means and a display, comprising in the memory a three-dimensional digital model of the workpiece, and adapted for recording coordinates of points acquired by the measurement sensor;
    the method comprising steps, implemented by the computer, of:
    i) obtaining a digital model of the workpiece comprising the face and sampling this model in a point cloud by a tessellation of faces of the digital model;
    ii) obtaining the acquisition distance, the acquisition volume and the acquisition direction cone of the measurement sensor;
    iii) creating a visibility graph GV, of the workpiece by:
        iii.a) segmenting the digital model of the workpiece into nodes, each node being included in the acquisition volume of the measurement sensor and a normal to each of the nodes being inside the acquisition direction cone of the measurement sensor;
        iii.b) determining a visibility of each node from positions of the measurement sensor with respect to the node;
        iii.c) determining common visibilities, designated as edges, between the nodes, two nodes being connected by an edge when an acquisition carried out in a fixed position with respect to the workpiece by the measurement sensor makes it possible to simultaneously cover at least a portion of a surface of each of the two nodes;
    iv) from the visibility graph GV obtained in step iii) defining a sequence of acquisitions making it possible to cover the face in a reduced number of overlapping acquisitions by defining a path connecting all the nodes of the face through a minimum number of edges of the visibility graph GV; and
    implementing the sequence of acquisitions defined in step iv) by moving the measurement sensor with the robot, between the positions allowing the sequence of acquisitions to be carried out.

2. The method of claim 1, wherein the digital model corresponds to a state of the workpiece after the first manufacturing operation of the manufacturing range.

3. The method of claim 1, wherein segmenting in step iii.a) comprises a segmentation of the point cloud by a dichotomy based on the acquisition direction cone of the measurement sensor and on the acquisition volume of the measurement sensor.

4. The method of claim 1, wherein step iii.b) comprises the computer implemented steps of:
- defining, using the acquisition distance of the measurement sensor, a voxelized space around the workpiece;
- projecting from each node a beam of lines contained in the acquisition direction cone of the measurement sensor centered on a normal to the node;
- determining voxels traversed by a line of the beam of lines; and
- determining a mapping of the visibility of each face, from the voxels thus traversed by a line.

5. The method of claim 1, wherein step iv) comprises determining a visibility subgraph GVbis out of the visibility graph GV by performing the steps of:
- a. determining nodes covering faces to be inspected;
- b. from the visibility graph GV, computing shortest paths connecting one of said nodes to other nodes of the faces to be inspected;
- c. repeating step b) for each of the nodes determined in step a), successively discarding the nodes already processed; and
- d. from a result of step c), determining an optimized graph GVbis minimizing a number of edges of GV of a path passing through all the nodes determined in a).

6. The method of claim 1, wherein the manufacturing fixture is palletized and allows the workpiece to be moved in its manufacturing fixture between different manufacturing stations.

7. The method of claim 3, comprising a step of obtaining a connectivity graph of the faces of the digital model and wherein step iii.a) comprises the steps of:
- segmenting the point cloud of a first face into first nodes;
- exploring a neighborhood of the first nodes in a second face neighboring the first face according to the connectivity graph; and
- when points of the second face that are not already included in one of the first nodes and when the points of the one of the first nodes and the points of the second face are in the acquisition volume and in the acquisition direction cone of the measurement sensor, integrating the points of the second face in the one node of the first nodes.

8. The method of claim 4, wherein, for carrying out step iii.b), the voxelized space comprises a set of voxels containing the workpiece and the projection of the beam of lines is carried out from each voxel of this set comprising a node portion using the normal to this node portion included in the voxel.

9. The method of claim 5, wherein step b) implements a Dijkstra's algorithm.

10. The method of claim 5, wherein the manufacturing fixture is within a machine tool comprising a work area in which the robot is adapted to access and to move the measurement sensor in a workspace of the machine tool and wherein step v) is performed in the work area of the machine tool.

11. The method of claim 10, wherein step v) includes moving the workpiece through the work area of the machine tool.

* * * * *